US009333995B1

(12) United States Patent
Piotrowski

(10) Patent No.: US 9,333,995 B1
(45) Date of Patent: May 10, 2016

(54) CROSSWIND AIRFLOW COUNTERING THRUST ASSEMBLY AND TRANSPORT VEHICLE FORMED THEREWITH

(71) Applicant: Matthew S. Piotrowski, Mesa, AZ (US)

(72) Inventor: Matthew S. Piotrowski, Mesa, AZ (US)

( * ) Notice: Subject to any disclaimer, the term of this patent is extended or adjusted under 35 U.S.C. 154(b) by 0 days.

(21) Appl. No.: 14/631,179

(22) Filed: Feb. 25, 2015

(51) Int. Cl.
*B62D 37/02* (2006.01)
*B62D 35/00* (2006.01)

(52) U.S. Cl.
CPC .............. *B62D 37/02* (2013.01); *B62D 35/00* (2013.01)

(58) Field of Classification Search
CPC ........... B62D 37/02; B62D 35/00; F15D 1/10
USPC ...................................... 296/180.1
See application file for complete search history.

(56) References Cited

U.S. PATENT DOCUMENTS

| 4,022,508 | A | 5/1977 | Kirsch et al. |
| 5,374,013 | A | 12/1994 | Bassett et al. |
| 7,255,387 | B2 | 8/2007 | Wood |
| 7,364,220 | B2 | 4/2008 | Shahbazi |
| 8,770,649 | B2 * | 7/2014 | Praskovsky .......... B62D 35/001 296/180.1 |
| 2008/0296904 | A1 | 12/2008 | Elahi |
| 2008/0303287 | A1 | 12/2008 | Meheen |
| 2009/0302639 | A1 * | 12/2009 | Neale ...................... B62D 35/00 296/180.1 |
| 2012/0056428 | A1 | 3/2012 | Bennett et al. |
| 2013/0101502 | A1 | 4/2013 | McAlister |

\* cited by examiner

*Primary Examiner* — Pinel Romain
(74) *Attorney, Agent, or Firm* — Michael W. Goltry; Robert A. Parsons; Parsons & Goltry

(57) ABSTRACT

A transport vehicle includes first and second sides, an exterior top surface, an exterior side surface depending downwardly from the exterior top surface at the first side, an inlet juxtaposed to the exterior side surface, an outlet juxtaposed to the exterior top surface, and a nozzle assembly coupled between the inlet and the outlet, the inlet for receiving a portion of a crosswind airflow against the exterior side surface of the transport vehicle and deflecting the portion of the crosswind airflow upwardly into the nozzle assembly as a diverted airflow, the nozzle assembly for routing the diverted airflow upwardly from the inlet toward the outlet and deflecting the diverted airflow outwardly through the outlet as a countering thrust airflow over the exterior top surface toward the second side of the transport vehicle for producing a reaction force for at least partially countering the crosswind airflow.

16 Claims, 11 Drawing Sheets

CROSSWIND AIRFLOW COUNTERING THRUST ASSEMBLY AND TRANSPORT VEHICLE FORMED THEREWITH

FIELD OF THE INVENTION

The present invention relates to transport vehicles and, more particularly, to apparatus and methods for stabilizing transport vehicles against crosswind airflows.

BACKGROUND OF THE INVENTION

A crosswind airflow is any wind that has a perpendicular component to the line or direction of travel. The effect of crosswind airflows is a critical problem in ground vehicle safety and stability, particular for vehicles having large side areas, such as vans, sport utility vehicles, tractor-trailers, motor homes, travel trailers, horse trailers, trains, etc. The combination between the vehicle movement and the action of a traversal turbulent wind generates a complex and highly unsteady flow field around the vehicle producing fluctuating aerodynamic forces and moments that can compromise vehicle stability, producing sideslip, overturning, or derailment. Vehicle accidents caused by sideslip, overturning, and derailment produced by crosswind airflows routinely result in driver and passenger injuries and fatalities and contribute to millions of dollars in lost annual revenue in transport of goods and people in commercial motor vehicle industry. Although the safest way for motorists to deal with crosswind airflows is by reducing vehicle speed and, if possible, turning into the direction of the crosswind airflow, drivers often realize the need to take this action too late, such as when sideslip, overturning, or derailment has commenced.

Accordingly, it is an object of the invention to suppress vehicle instability in ground transport vehicles moving in a crosswind airflow, to suppress the aerodynamic forces and moments that crosswind airflows can exert against ground transport vehicles running in crosswind airflows, and to suppress driver fatigue in drivers, and the need for driver overcorrection or over-steering by drivers, driving ground transport vehicles in crosswind airflows.

SUMMARY OF THE INVENTION

According to an illustrative embodiment of the invention, a transport vehicle includes a first side, a second side, an exterior top surface, an exterior side surface depending downwardly from the exterior top surface at the first side, an inlet juxtaposed to the exterior side surface, an outlet juxtaposed to the exterior top surface, and a nozzle assembly coupled between the inlet and the outlet. The inlet is for receiving a portion of a crosswind airflow against the exterior side surface of the transport vehicle and deflecting the portion of the crosswind airflow upwardly into the nozzle assembly as a diverted airflow. The nozzle assembly is for routing the diverted airflow upwardly from the inlet toward the outlet and deflecting the diverted airflow outwardly through the outlet as a countering thrust airflow over the exterior top surface of the transport vehicle toward the second side of the transport vehicle for producing a reaction force for at least partially countering the crosswind airflow. The nozzle assembly includes a motive fluid nozzle, a venturi tube, a de Laval nozzle, and an ejection nozzle coupled in series from the inlet to the outlet. The inlet is NACA duct.

According to another illustrative embodiment of the invention, a transport vehicle includes a first side, a second side, an exterior top surface, an exterior side surface depending downwardly from the exterior top surface at the first side, an inlet juxtaposed to the exterior side surface, an outlet juxtaposed to the exterior top surface, and a nozzle assembly coupled between the inlet and the outlet. The inlet is for receiving a portion of a crosswind airflow against the exterior side surface of the transport vehicle and deflecting the portion of the crosswind airflow upwardly into the nozzle assembly as a diverted airflow. The crosswind airflow includes a first force vector component. The first force vector component has a direction of force that is toward, and perpendicular relative to, the exterior side surface of the transport vehicle, and a first magnitude. The nozzle assembly is for routing the diverted airflow upwardly from the inlet toward the outlet juxtaposed to the exterior top surface, and deflecting the diverted airflow outwardly through the outlet as a countering thrust airflow over the exterior top surface of the transport vehicle toward the second side of the transport vehicle. The countering thrust airflow includes a second force vector component. The second force vector component has a direction of force that is toward the second side of the transport vehicle and away from the first side of the transport vehicle, that is perpendicular relative to the exterior side surface of the transport vehicle, and that has a second magnitude that is at least a portion of the first magnitude of the first vector component. The second force vector component of the countering thrust airflow from the outlet is for producing a reaction force in a countering direction opposite to the direction of the first force vector component and the direction of the second force vector component for at least partially countering the first magnitude of the first force vector component. The nozzle assembly includes a motive fluid nozzle, a venturi tube, a de Laval nozzle, and an ejection nozzle coupled in series from the inlet to the outlet. The inlet is NACA duct.

According to yet another illustrative embodiment of the invention, a transport vehicle includes a leading end, a trailing end, a first side, a second side, an exterior top surface, and an exterior side surface depending downwardly from the exterior top surface at the first side. Crosswind airflow countering thrust assemblies are mounted to the transport vehicle between the leading end and the trailing end of the transport vehicle. Each one of the crosswind airflow countering thrust assembly includes an inlet juxtaposed to the exterior side surface, an outlet juxtaposed to the exterior top surface, and a nozzle assembly coupled between the inlet and the outlet. The inlet is for receiving a portion of a crosswind airflow against the exterior side surface of the transport vehicle and deflecting the portion of the crosswind airflow upwardly into the nozzle assembly as a diverted airflow. The nozzle assembly is for routing the diverted airflow upwardly from the inlet toward the outlet and deflecting the diverted airflow outwardly through the outlet as a countering thrust airflow over the exterior top surface of the transport vehicle toward the second side of the transport vehicle for producing a reaction force for at least partially countering, the crosswind airflow. The nozzle assembly includes a motive fluid nozzle, a venturi tube, a de Laval nozzle, and an ejection nozzle coupled in series from the inlet to the outlet. The inlet is NACA duct. A forward wind deflector is coupled between the leading end of the transport vehicle and a forward-most one of the crosswind airflow countering thrust assemblies proximate to the leading end of the transport vehicle. A rearward wind deflector is coupled between the trailing end of the transport vehicle and a rearward-most one of the crosswind airflow countering thrust assemblies proximate to the trailing end of the transport vehicle.

According to still another illustrative embodiment of the invention, a transport vehicle includes a leading end, a trailing end, a first side, a second side, an exterior top surface, and an exterior side surface depending downwardly from the exterior top surface at the first side. Crosswind airflow countering thrust assemblies are mounted to the transport vehicle between the leading end and the trailing end of the transport vehicle. Each one of the crosswind airflow countering thrust assemblies includes an inlet juxtaposed to the exterior side surface, an outlet juxtaposed to the exterior top surface, and a nozzle assembly coupled between the inlet and the outlet. The inlet is for receiving a portion of a crosswind airflow against the exterior side surface of the transport vehicle and deflecting the portion of the crosswind airflow upwardly into the nozzle assembly as a diverted airflow. The crosswind airflow includes a first force vector component. The first force vector component has a direction of force that is toward, and perpendicular relative to, the exterior side surface of the transport vehicle, and a first magnitude. The nozzle assembly is for routing the diverted airflow upwardly from the inlet toward the outlet juxtaposed to the exterior top surface, and deflecting the diverted airflow outwardly through the outlet as a countering thrust airflow over the exterior top surface of the transport vehicle toward the second side of the transport vehicle. The countering thrust airflow includes a second force vector component. The second force vector component has a direction of force that is toward the second side of the transport vehicle and away from the first side of the transport vehicle, that is perpendicular relative to the exterior side surface of the transport vehicle, and that has a second magnitude that is at least a portion of the first magnitude of the first vector component. The second force vector component of the countering thrust airflow from the outlet is for producing a reaction force in a countering direction opposite to the direction of the first force vector component and the direction of the second force vector component for at least partially countering the first magnitude of the first force vector component. The nozzle assembly includes a motive fluid nozzle, a venturi tube, a de Laval nozzle, and an ejection nozzle coupled in series from the inlet to the outlet. The inlet is NACA duct. A forward wind deflector is coupled between the leading end of the transport vehicle and a forward-most one of the crosswind airflow countering thrust assemblies proximate to the leading end of the transport vehicle. A rearward wind deflector coupled between the trailing end of the transport vehicle and a rearward-most one of the crosswind airflow countering thrust assemblies proximate to the trailing end of the transport vehicle.

Consistent with the foregoing summary of illustrative embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
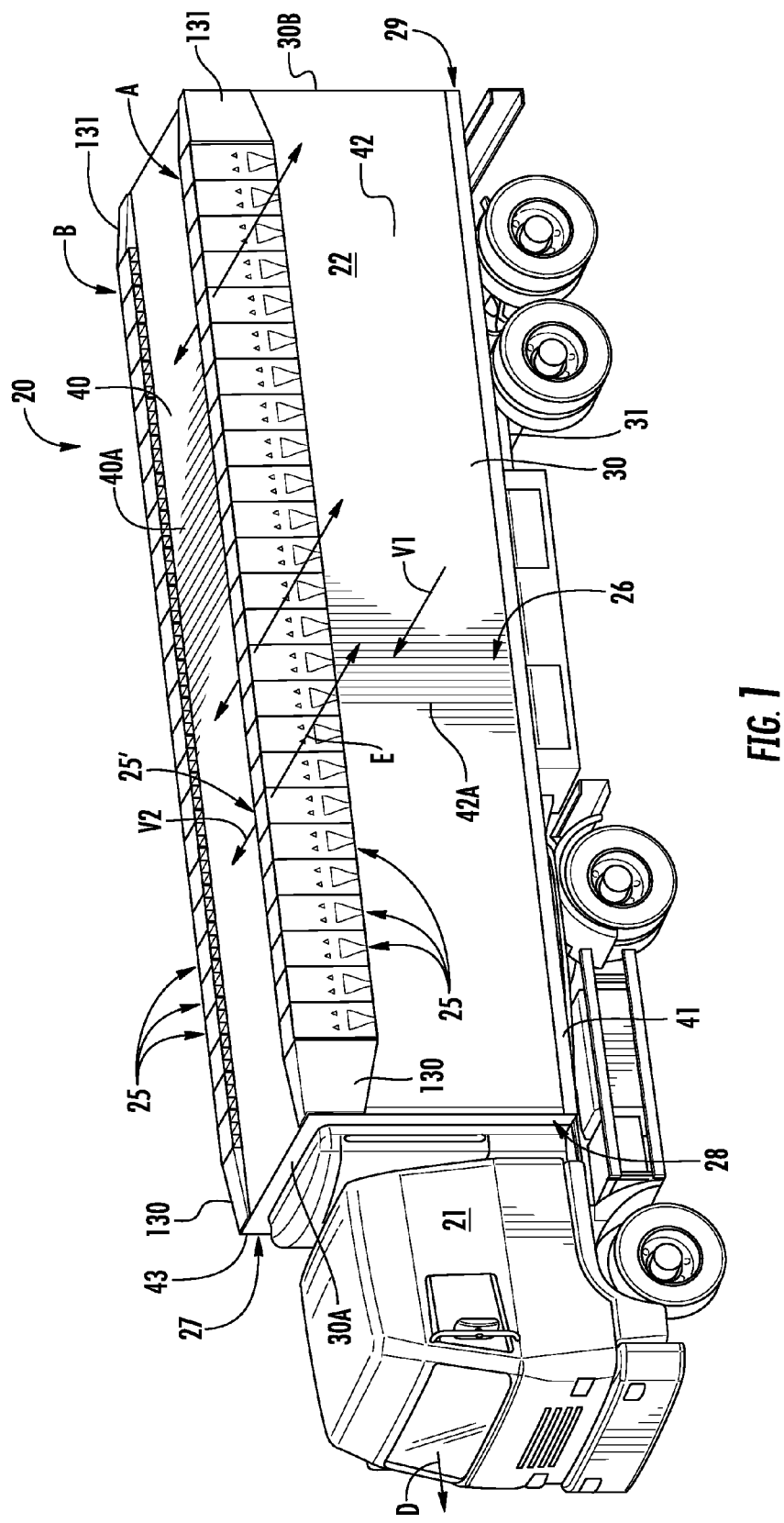
FIG. 1 is a street side perspective view of a tractor-trailer ground vehicle including a tractor attached to a semi-trailer to carry freight, and crosswind airflow countering thrust assemblies mounted to semi-trailer for stabilizing the tractor-trailer ground vehicle against crosswind airflows.
Figure 2:
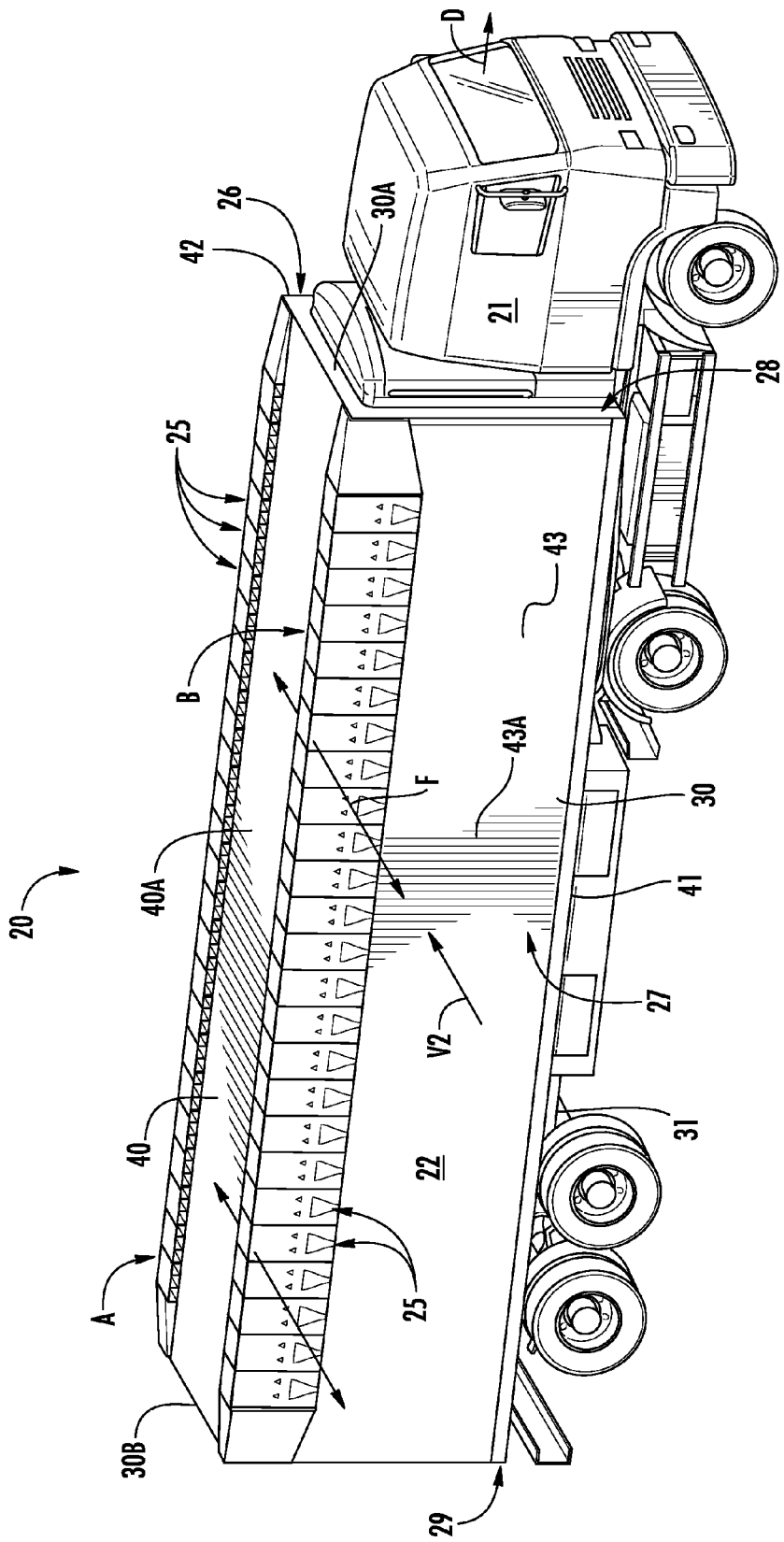
FIG. 2 is a curb side perspective view of the embodiment of FIG. 1.

Turning now to the drawings, in which like reference characters indicate corresponding elements throughout the several views, attention is first directed to FIGS. 1 and 2 in which there is seen a vehicle 20 including a towing engine or tractor 21 attached to a trailer 22 to carry freight. Tractor 21 is a standard powered truck having two axles in this example. In other examples, a tractor having three or more axles, some often being lift axles, can be used. Trailer 22 is a standard semi-trailer having no front axle, and tractor 21 includes the customary fifth-wheel trailer coupling to which trailer 22 is attached. The fifth-wheel trailer coupling of tractor 21 is located forward of the rear-most axle of tractor 21. This is done so that a large portion of the weight of trailer 22 is carried by tractor 21.

Trailer 22 includes opposed sides 26 and 27 that extend from leading end 28 to trailing end 29. Side 26 is the left or street side of trailer 22, and side 27 is the right or curb side of trailer 22. Trailer 22 includes a cargo body or container 30 carried by a chassis 31 incorporating a tandem axle pair at the rear of trailer 22 proximate to trailing end 29, each of which has dual wheels in this example, and a kingpin at the front that secures the fifth-wheel trailer coupling of tractor 21. Trailer 22 is equipped with the customary landing gear, legs that can be lowered and raised, to support it when it is uncoupled.

Referring in relevant part to FIGS. 1-4, cargo container 30 includes top panel 40, floor panel 41, side panel 42 at side 26 of trailer 22, and side panel 43 at side 27 of trailer 22. Top panel 40, floor panel 41, and side panels 42 and 43 extend from a front end 30A of cargo container 30 at leading end 28 of trailer 22 to a rear end 30B of cargo container 30 at trailing end 29 of trailer 22. Top and bottom panels 40 and 41 are horizontal. Top panel 40, at the top or upper end of cargo container 30, and thus trailer 22, is parallel relative to floor panel 41 at chassis 31, at the bottom or lower end of cargo container 30, and thus trailer 22. Side panels 42 and 43 are upright, and are parallel relative to each other and perpendicular relative to top panel 40 and floor panel 41. Side panel 42 depends vertically downwardly from top panel 40 to floor panel 41 at side 26 of trailer 22, and side panel 43 depends downwardly from top panel 40 to floor panel 41 at side 27 of trailer 22. An upper street side longitudinal corner is formed between side panel 42 and top panel 40, which extends longitudinally along the length of cargo container 30 from front end 30A at leading end 28 of trailer 22 to rear end 30B at trailing end 29 of trailer 22. An upper curb side longitudinal corner is formed between side panel 43 and top panel 40, which extends longitudinally along the length of cargo container 30 from front end 30A at leading end 28 of trailer 22 to rear end 30B at trailing end 29 of trailer 22.

Figure 4:
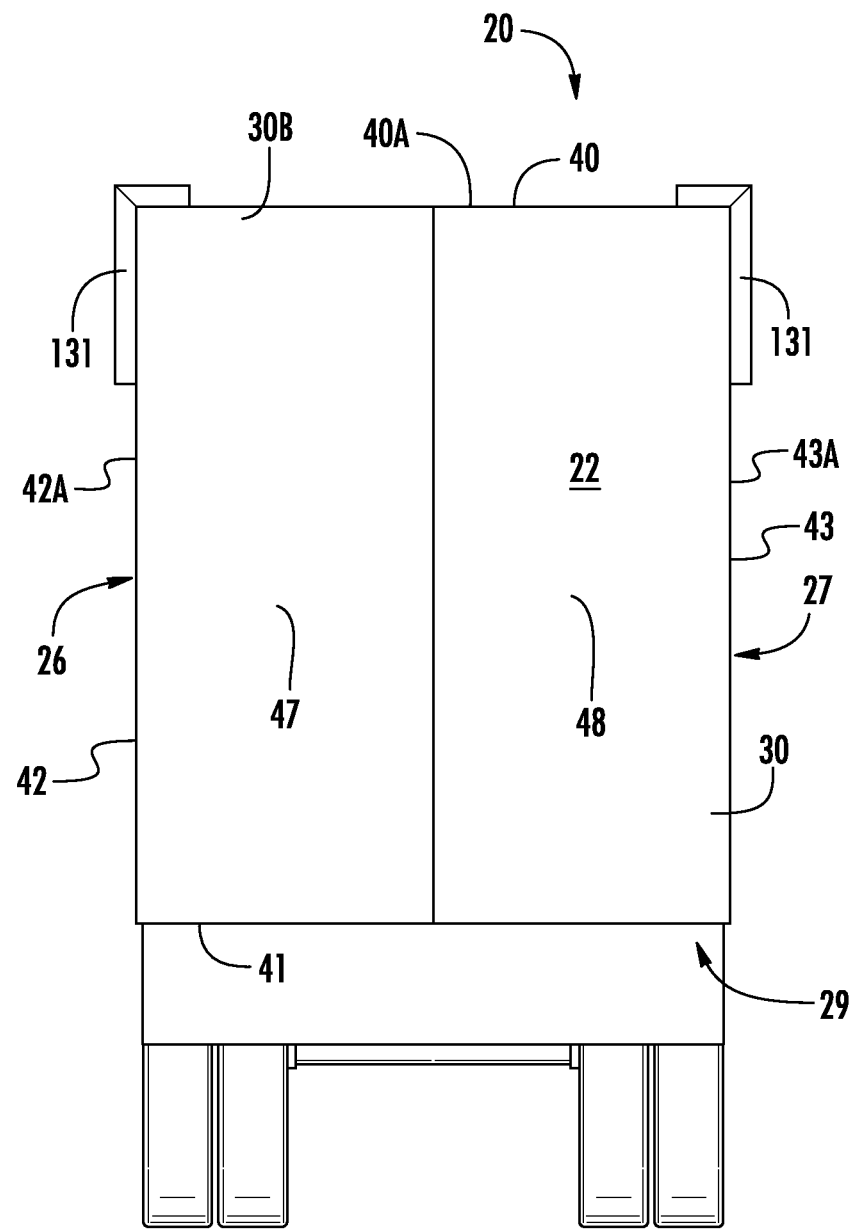
FIG. 4 is a rear elevation view of the embodiment of FIG. 1.
Figure 5:
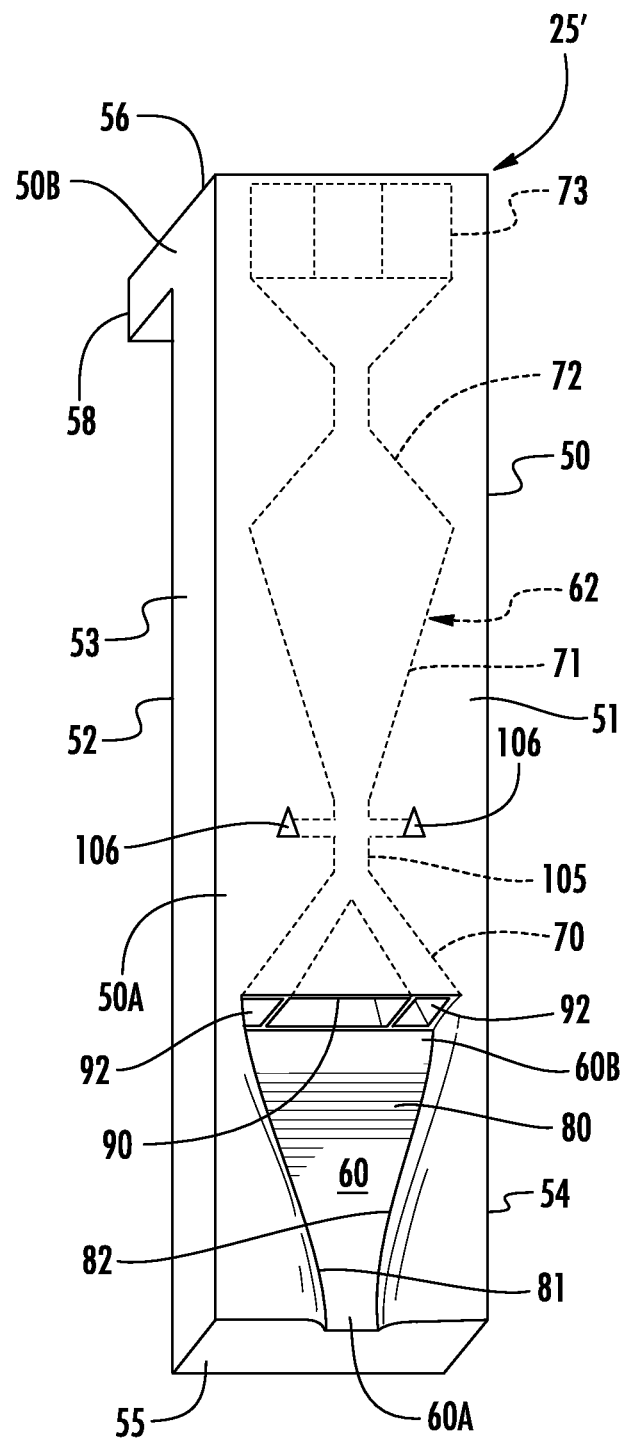
FIG. 5 is a left side perspective view of one of the crosswind airflow countering thrust assemblies of FIG. 1, with portions thereof depicted in phantom line for illustrative purposes.
Figure 6:
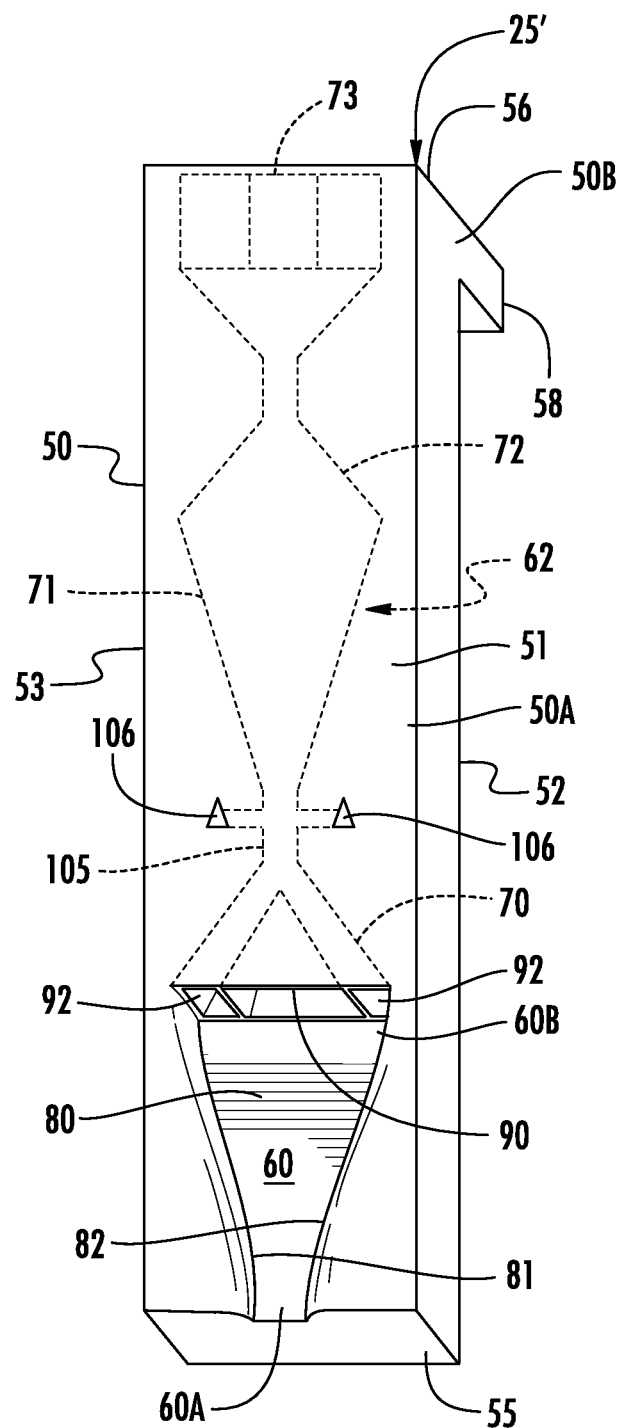
FIG. 6 is a right side elevation view of the embodiment of FIG. 5.

Top panel 40 has an exterior top surface 40A, side panel 42 has exterior side surface 42A, and side panel 43 has exterior side surface 43A. Exterior top surface 40A of top panel 40 is horizontal. Exterior side surfaces 42A and 43A are upright and are parallel relative to each other, and are perpendicular relative to exterior top surface 40A of top panel 40. Exterior top surface 40A and exterior side surface 42A join at the upper street side longitudinal corner at the top or upper end of vehicle 20 cargo container 30, and exterior top surface 40A and exterior side surface 43A join at the upper curb side longitudinal corner at the top or upper end of vehicle 20 cargo container 30. Exterior side surface 42A of side panel 42 depends vertically downwardly from exterior top surface 40A of top panel 40 to floor panel 41 at side 26 of trailer 22, and exterior side surface 43A of side panel 43 depends downwardly from exterior top surface 40A of top panel 40 to floor panel 41 at side 27 of trailer 22. Top panel 40, floor panel 41, and side panels enclose the customary storage area of cargo container 30 of trailer 22 that extends from front end 30A of cargo container 30 at leading end 28 of trailer 22 to rear end 30B of cargo container 30 at trailing end 29 of trailer 22. In FIG. 4, rear end 30B of cargo container 30 is formed with the customary doors 47 and 48 for opening the customary access opening at rear end 30B to the storage area of cargo container 30 for loading and unloading and closing the access opening to the storage area of cargo container 30. Top panel 40, floor panel 41, and side panels 42 and 43 can each be formed of a unitary sheet of material, a plurality of panel segments fastened together with mechanical fasteners, adhesive, or the like, or can be a paneled framework construction.

Tractor 21 is a motorized vehicle, and trailer 22 is a non-motorized vehicle. Trailer 22 is towed by tractor 21, and trailer 22 is used to transport cargo. Accordingly, trailer 22 is a form of a transport vehicle and, more specifically, a non-motorized transport vehicle that is towed by a towing vehicle or tractor for transport. Trailer 22 is a standardly-sized semi-trailer. In this example, trailer 22 has a standard length of fifty-three feet from leading end 28 to trailer end 29, a standard width of eight feet from side 26 to side 27, and a standard height of thirteen feet from the ground over which trailer 22 is driven and top panel 40. These are standard dimensions for a semi-trailer.

The foregoing description of vehicle 20 set forth for the purposes of orientation and reference in connection with the ensuing discussion of illustrative embodiments of the instant invention is intended to be generally representative of typical, prior art, commercially available, high profile tractor-trailer ground vehicle for hauling cargo or freight. Accordingly, further details of vehicle 20, including tractor 21 and trailer 22, not specifically set forth and described will readily occur to those having regard for the relevant art.

Quantities such as force, velocity, acceleration, moment, and displacement which must, in order to be specified completely, have a specific direction and well as magnitude, are called force vector quantities. Of particular concern is a crosswind airflow, which is any wind that includes a force vector component having a direction of force that is perpendicular to the line or direction of travel and that has a magnitude. In FIGS. 1 and 2, arrowed line D denotes a forward line or direction of travel of vehicle 20. Line or direction D of travel of vehicle 20 is parallel to exterior side surfaces 42A and 43A of side panels 42 and 43 of trailer 22. A crosswind airflow blowing across line of travel A in the direction of exterior side surface 42A of side panel 42 of trailer 22 has a force vector component V1 in FIG. 1. Force vector component V1 has a direction of force that is perpendicular relative to line or direction D of travel of vehicle 20, that is toward, and perpendicular relative to, exterior side surface 42A of cargo container 30 of trailer 22, and that has a magnitude. The magnitude of the force of vector component V1, the moment of which is greatest at the upper street side longitudinal corner of cargo container 30 at the upper end or top of cargo container 30 of trailer 22, can be relatively constant or can fluctuate as this is dependent on nature. A crosswind airflow blowing across line of travel A in the direction of exterior side surface 43A of side panel 43 of trailer 22 has a force vector component V2 in FIG. 2. Force vector component V2 has a direction of force that is perpendicular relative to line or direction D of travel of vehicle 20, that is toward, and perpendicular relative to, exterior side surface 43A of cargo container 30 of trailer 22, and that has a magnitude. The magnitude of the force of vector component V2, the moment of which is greatest at the upper curb side longitudinal corner of cargo container 30 at the upper end or top of cargo container 30 of trailer 22, can be relatively constant or can fluctuate as this is dependent on nature.

According to the principle of the invention, crosswind airflow countering thrust assemblies 25 are mounted to either side of cargo container 30 of trailer 22 at the upper end of vehicle 20 cargo container 30 of trailer 22 along the length of cargo container 30 of trailer 22 between front end 30A at leading end 28 of trailer 22 and rear end 30B at trailing end 29 of trailer 22 for stabilizing trailer 22, and thus vehicle 20 as a whole, against crosswind airflows. Assemblies 25 are mounted at the upper end of vehicle 20 cargo container 30 of trailer 22 side-by-side in rows A and B along either side of cargo container 30 of trailer 22 along the upper street and curb side corners of cargo container 30 between top panel 40 and side panels 42 and 43. Rows A and B of assemblies 25 extend longitudinally along the length of cargo container 30 of trailer 22 along the upper street and curb side corners of vehicle 20 cargo container 30 from proximate to front end 30A of cargo container 30 at leading end 28 of trailer 22 to proximate to rear end 30B of cargo container 30 at trailing end 29 of trailer 22. Row A of assemblies 25 is on the left or street side 26 of trailer 22 and extends along top panel 40 and side panel 42 and the upper street side longitudinal corner of vehicle 20 cargo container 30 between leading end 28 and trailing end 29 of trailer 22, and row B of assemblies 35 is on the right or curb side 27 of trailer 22 and extends along top panel 40 and side panel 43 and the upper curb side longitudinal corner of vehicle 20 cargo container 30 between leading end 28 and trailing end 29 of trailer 22.

Each assembly 25 of row A of assemblies 25 is designed to harvest a portion of a crosswind airflow against exterior side surface 42A of trailer 22, and reroute/redirect the harvested portion of the crosswind airflow upwardly away from the ground over which vehicle 20 is driven, and eject the harvested portion of the crosswind airflow outwardly over exterior top surface 40A away from street side 26 of trailer 22 in the direction of the curb side 27 of trailer 22 at the top or upper end of cargo container 30 of trailer 22 where the moment of the magnitude of force of vector component V1 of the crosswind is greatest for producing a reaction force, a countering reaction force that is opposite to and that works/pushes against the crosswind airflow, for at least partially countering the crosswind airflow against exterior side surface 42A for at least partially alleviating instability and safety problems in vehicle 20 running in the crosswind airflow all for the purposes of improving safety in handling the vehicle and inhibiting the need for the driver to overcorrect the vehicle or having to drive against or steer into the crosswind, and for inhibiting vehicle 20 from rolling or tipping over in response to exposure to the crosswind.

Assemblies 25 of row A of assemblies 25 therefor cooperate to harvest portions of a crosswind airflow against exterior side surface 42A of trailer 22, and reroute/redirect the harvested portions of the crosswind airflow upwardly away from the ground over which vehicle 20 is driven, and eject the harvested portions of the crosswind airflow outwardly over exterior top surface 40A away from street side 26 of trailer 22 in the direction of the curb side 27 of trailer 22 at the top or upper end of cargo container 30 of trailer 22 where the moment of the magnitude of force of vector component V1 of the crosswind is greatest for producing a reaction force, a countering reaction force, that is opposite to, and that pushes against and least partially counters, the magnitude of force of vector component V1 of the crosswind airflow against exterior side surface 42A for at least partially alleviating instability and safety problems in vehicle 20 running in the crosswind airflow.

Identically, each assembly 25 of row B of assemblies 25 is designed to harvest a portion of a crosswind airflow against exterior side surface 43A of trailer 22, and reroute/redirect the harvested portion of the crosswind airflow upwardly away from the ground over which vehicle 20 is driven, and eject the harvested portion of the crosswind airflow outwardly over exterior top surface 40 away from curb side 27 of trailer 22 in the direction of the street side 26 of trailer 22 at the top or upper end of cargo container 30 of trailer 22 where the moment of the magnitude of force of vector component V1 of the crosswind is greatest for producing a reaction force, a countering reaction force, that is opposite to, and that at least partially counters, the crosswind airflow against exterior side surface 43A for at least partially alleviating instability and safety problems in vehicle 20 running in the crosswind airflow. Assemblies 25 of row B of assemblies 25 therefor cooperate to harvest portions of a crosswind airflow against exterior side surface 43A of trailer 22, and reroute/redirect the harvested portions of the crosswind airflow upwardly away from the ground over which vehicle 20 is driven, and eject the harvested portions of the crosswind airflow outwardly over exterior top surface 40A away from curb side 27 of trailer 22 in the direction of the street side 26 of trailer 22 at the top or upper end of cargo container 30 of trailer 22 where the moment of the magnitude of force of vector component V1 of the crosswind is greatest for producing a reaction force, a countering reaction force, that is opposite to, and that at least partially counters, the crosswind airflow against exterior side surface 43A for at least partially alleviating instability and safety problems in vehicle 20 running in the crosswind airflow.

Assemblies 25 are identical in every respect. Accordingly, assembly 25' denoted in FIGS. 1-3 of row A of assemblies 25 will be discussed in detail, with the understanding that the discussion of assembly 25' applies in every respect to each and every one of assemblies 25 of rows A and B of assemblies 25.

Figure 7:
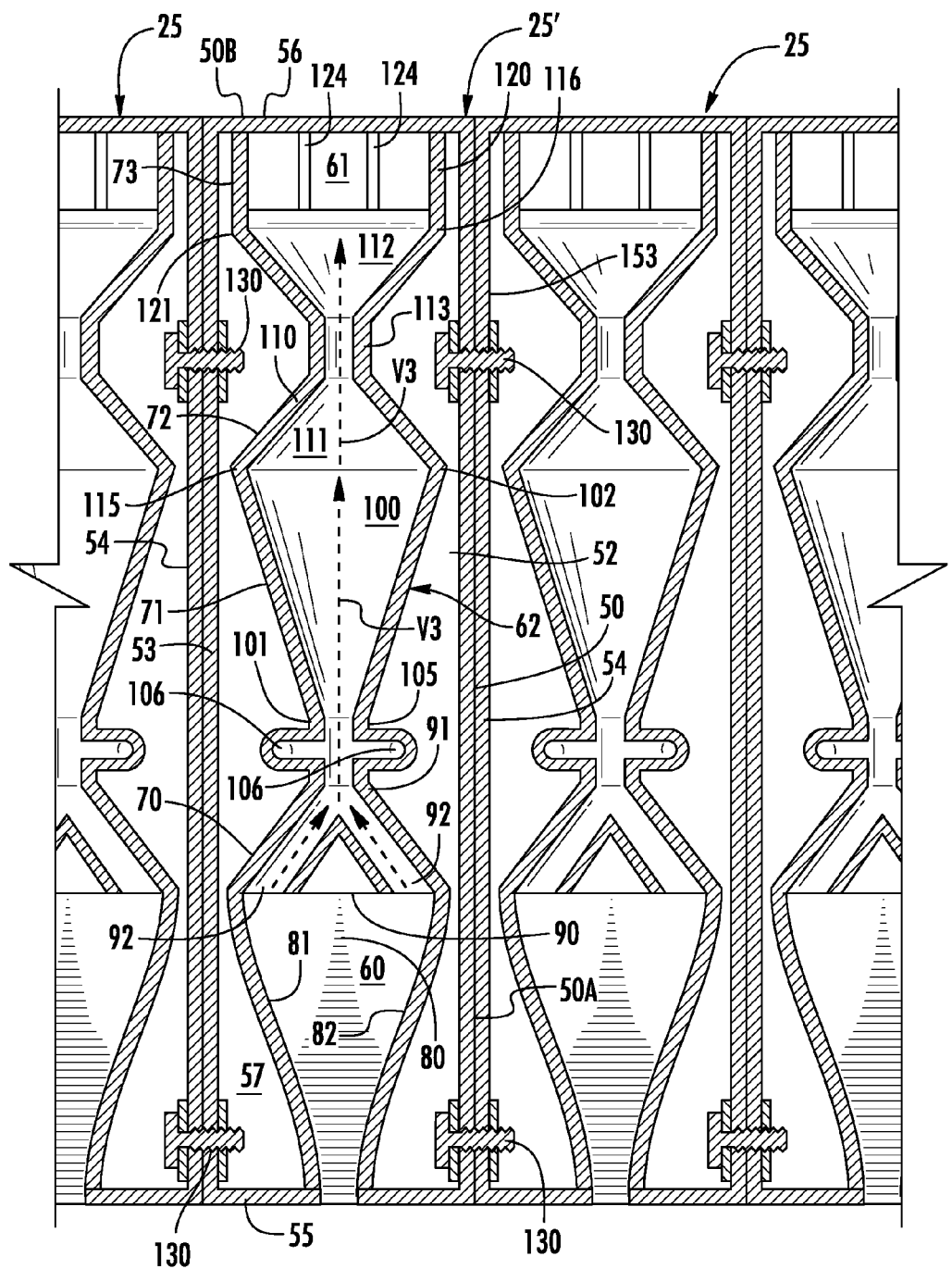
FIG. 7 is a section view taken along line 7-7 of FIG. 3.
Figure 8:
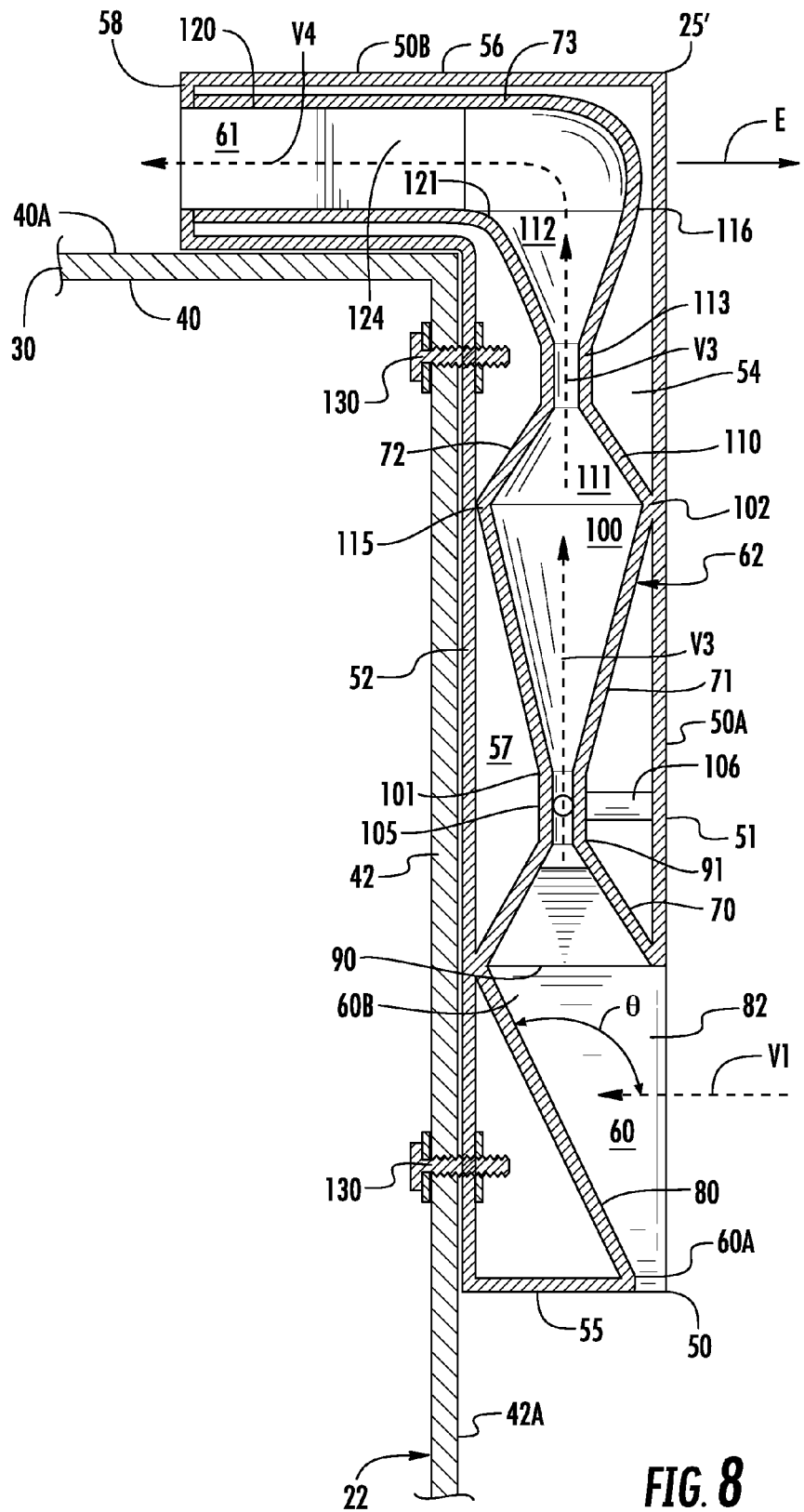
FIG. 8 is a section view taken along line 8-8 of FIG. 3.

Referring to FIGS. 5-8 in relevant part, assembly 25' includes housing 50, which is constructed of paneling fashioned of aluminum, plastic, carbon fiber, a metal composite, a plastic composite, or other like or similar material or combination of materials having the inherent properties of strength, resilience, impact resistance, and resistance to exposure to environmental influences, such precipitation, wind, and sunlight. Housing 50 is hollow and includes front 51, back 52, and sides 53 and 54. Front 51 and back 52 are parallel relative to each other, and extend between sides 53 and 54, which are parallel relative to each other. Front 51, back 52, and sides 53 and 54 define a vertical portion 50A of housing 50 that is rectangular in cross section and that extends vertically upright from closed lower end 55 of housing to upper end 56 of housing 50, and a horizontal portion 50B of housing 50 at upper end 56 that is rectangular in cross section and that projects outwardly with respect to back 52 from upper end 56 to an open outer end 58 of housing 50. Horizontal portion 50B of housing 50 is perpendicular relative to vertical portion 50A of housing 50. In FIGS. 7 and 8, housing 50 encloses volume 57 from closed lower end 55 of vertical portion 50A of housing 50 to open outer end 58 of horizontal portion 50B of housing 50 in FIG. 8, and carries inlet 60 proximate to lower end 55, outlet 61 (shown only in FIG. 8) at open outer end 58 at upper end 56 of housing 50, and nozzle assembly 62. Nozzle assembly 62 extends vertically upward through volume 57 of vertical portion 50A of housing 50 from inlet 60 to upper end 56, and horizontally through volume 57 of horizontal portion 50B to outlet 61, and is coupled in gaseous communication to inlet 60 and to outlet 61. Nozzle assembly 62 is depicted in phantom line in FIGS. 5 and 6. Inlet 60 and nozzle assembly 62 from inlet 60 to outlet 61 are formed of aluminum, plastic, carbon fiber, a metal composite, a plastic composite, or other like or similar materials having the inherent properties of strength, resilience, impact resistance integrated, and are formed integrally, such as through a molding or mold-forming process, or connected together via welding, heat bonding, or the like.

In FIGS. 5-8, nozzle assembly 62 coupled between inlet 60 and outlet 61 includes a motive fluid nozzle 70, a venturi tube 71, a de Laval nozzle 72, and an ejection nozzle 73 coupled in series from inlet 60 to outlet 61. Motive fluid nozzle 70, venturi tube 71, and de Laval nozzle 72 extend vertically upward through volume 57 of vertical portion 50A of housing 50 from inlet 60 at lower end 55 of housing 50 to upper end 56 of housing 50 at horizontal portion 50B of housing 50, and ejection nozzle 73 extends upwardly through volume 57 from de Laval nozzle 72 into horizontal portion 50A of housing 50, bends into volume 57 of horizontal portion 50B and extends horizontally through and follows volume 57 of horizontal portion 50 to outlet 61 at upper end 56 of housing 50. Motive fluid nozzle 70 is coupled between inlet 60 and venturi tube 71, de Laval nozzle 72 is coupled between venturi tube 71 and ejection nozzle 73, and ejection nozzle 73 is coupled between de Laval nozzle 72 and outlet 61.

Looking in relevant part to FIGS. 5-8, inlet 60 is a NACA duct. NACA duct 60 is a common form of low drag intake design originally developed by the National Advisory Committee for Aeronautics (NACA), the precursor to the National Aeronautics and Space Administration (NASA), in 1928. As is well known, NACA duct allows air to be drawn into an internal duct with a minimal disturbance to the flow and to the boundary layer, which is the layer of the airflow in the immediate vicinity of the surface of the NACA duct. The design was originally called a "submerged inlet," because it includes a shallow ramp or ram floor with curved walls recessed into the exposed surface of a streamlined body. In this instance, NACA duct 60 includes the customary shallow ramp or ram floor 80 with customary curved walls 81 and 82 recessed into volume 57 from the exposed surface of outer side 51 of housing 50. Ram floor 80 and curved walls 81 and 82 extend gradually inward into volume 57 from front 51 of housing 50 to back 52 of housing 50. NACA duct 60 has a narrow end 60A and a comparatively enlarged outer end 60B. Narrow end 60A is the entrance end of the NACA duct 60, and comparatively larger end 60B is the exit end of the NACA duct 60.

NACA duct 60 extends vertically upright into volume 57 of vertical portion 50A of housing 50 from narrow inner end 60A at lower end 55 of housing 50 to enlarged outer end 60B at motive fluid nozzle 70. NACA duct 60 is narrowed at inner end 60A and is comparatively enlarged at outer end 60B, and widens in a graceful arc from inner end 60A to outer end 60B in accordance with conventional practice. The cross-sectional flow area of NACA duct 60 gracefully increases from inner end 60A to outer end 60 in accordance with known NACA ducts, and gradually increases from front 51 of housing 50 to back 52 of housing 50 as shown in FIG. 8. NACA duct 60 is the inlet to motive fluid nozzle 70, which is coupled to receive an air flow from enlarged outer end 60B of NACA duct 60. In FIG. 8, ram floor 80 extends upwardly into volume 57 of vertical portion 50A of housing 50 from lower end 55 and is angled inwardly toward back 51 of housing from front 51 of housing 50 at lower end 55 to back 52 of housing 50.

In FIG. 7, motive fluid nozzle 70 is conventional and readily available and includes inner end 90 coupled to enlarged outer end 60B of NACA duct 60, and opposed outer end 91. Convergent ducts 92 on either side of motive fluid nozzle 70 extend through motive fluid nozzle 70 from inner end 90, adjacent to the respective sides 53 and 54 of housing 50, to outer end 91. Convergent ducts 92 are open to receive an air flow from enlarged outer end 60B of NACA duct 60 adjacent to the respective sides 53 and 54 of housing 50, and converge upwardly through motive fluid nozzle 70 from inner end 90 to outer end 91.

Venturi tube 71 is a divergent cone 100 having inner end 101 and outer end 102. Outer end 102 is comparatively larger than inner end 101. Accordingly, inner end 101 is the narrow end of venturi tube 71, and outer end 102 is the enlarged end of venturi tube 71. Conduit 105 couples outer end 91 of motive fluid nozzle 70 to inner end 101 of divergent cone 100. Divergent cone 100 diverges vertically upward through volume 57 of vertical portion 50A of housing 50 from inner end 101, coupled to outer end 91 of motive fluid nozzle 70 with conduit 105, to outer end 102. The cross-sectional flow area of venturi tube 71 gradually increases from inner end 101 to outer end 102. Conduit 105, outer end 91 of motive fluid nozzle 70, and inner end 101 of divergent cone 100 of venturi tube 71 have the same inner diameters. In FIGS. 5-8, a pair of air intake conduits 106 extends from front 51 of vertical portion 50A of housing 50 between lower end 55 of housing 50 and upper end 56 of housing 50 to conduit 105. Conduit 105 is indicated in phantom line in FIGS. 5 and 6.

In FIGS. 7 and 8, de Laval nozzle 72 is a conventional convergent-divergent nozzle consisting of a tube 110 that is pinched in the middle to form convergent and divergent lower and upper cones 111 and 112 on either side of a constricted or pinched middle 113. The de Laval nozzle 72 has inner end 115 coupled to outer end 102 of venturi tube 71, and outer end 116 coupled to ejection nozzle 73. Convergent lower cone 111 converges vertically upward through volume 57 of vertical portion 50A of housing 50 from inner end 115 coupled to outer end 102 of venturi tube 71 to pinched middle 113, and divergent upper cone diverges vertically upward through volume 57 of vertical section 50A of housing 50 from pinched middle 113 to outer end 116 coupled to ejection nozzle 73. The cross-sectional flow area of convergent lower cone 111 is the same as the cross-sectional flow arear of divergent upper cone 112. The cross-sectional flow area of convergent lower cone 111 gradually decreases from inner end 115 to pinched middle 113, and the cross-sectional flow area of divergent upper cone 112 gradually increases from pinched middle 113 to outer end 116 coupled to ejection nozzle 73.

In FIGS. 7 and 8, ejection nozzle 73 is a duct 120 having inner end 121 and an outer end, which is outlet 61 in FIG. 8. In FIGS. 7 and 8, inner end 121 of duct 120 is coupled to outer end 116 of de Laval nozzle 72. In FIG. 8, duct 120 extends upwardly through volume 57 of vertical portion 50A of housing 50 and curves into volume 57 of horizontal portion 50B of housing 50 and extends through and follows volume 57 of horizontal portion 50B of housing to outlet 61 at open outer end 58 of housing 50. Outer end 116 of divergent upper cone 112 of de Laval nozzle 72 is the maximum cross-sectional flow area of divergent upper cone 112. The cross-sectional flow area of duct 120 of ejection nozzle 73 is the same as the flow area of outer end 116 of divergent upper cone 112 and is constant from inner end 121 to outlet 61. In FIG. 7, duct 120 is formed with force vectoring vanes 124 for directing an airflow outwardly through outlet 61 through open outer end 58 of housing 50.

As indicated above in connection with FIGS. 1 and 2, crosswind airflow countering thrust assemblies 25 are mounted to either side of cargo container 30 of trailer 22 at the upper end of cargo container 30 of trailer 22 along the length of cargo container 30 of trailer 22 between front end 30A at leading end 28 of trailer 22 and rear end 30B at trailing end 29 of trailer 22 for stabilizing trailer 22, and this vehicle 20 as a whole, against crosswind airflows. Assemblies 25 are mounted at the upper end of cargo container 30 of trailer 22 side-by-side in rows A and B along either side of cargo container 30 of trailer 22 along the upper street side and curb side corners of cargo container 30 of trailer 22 between top panel 40 and side panels 42 and 43. Rows A and B of assemblies 25 extends longitudinally along the length of cargo container 30 of trailer 22 from proximate to front end 30A of cargo container 30 at leading end 28 of trailer 22 to proximate to rear end 30B of cargo container 30 at trailing end 29 of trailer 22. Row A of assemblies 25 is on the left or street side 26 of trailer 22 and extends along top panel 40 and side panel 42 of cargo container 30 between leading end 28 and trailing end 29 of trailer 22, and row B of assemblies 35 is on the right or curb side 27 trailer 22 and extends along top panel 40 and side panel 43 of cargo container 30 between leading end 28 and trailing end 29 of trailer 22.

In FIG. 1, assemblies 25 of row A of assemblies 25 are oriented upright from lower ends 55 to upper ends 56, are connected together side 53 to side 54, are axially aligned side 53 by side 54 longitudinally along the length of cargo container 30 from proximate to front end 30A of cargo container 30 and at leading end 28 of trailer 22 to proximate to rear end 30B of cargo container 30 at trailing end 29 of trailer 22, and are each connected to cargo container 30 at the upper end of cargo container 30 of trailer 22 along side 26 of trailer 22. The back 52 of vertical portion 50A of each assembly 25 is positioned against exterior side surface 42A of side panel 42 near the upper end of cargo container 30, and the vertical portion 50A of each assembly 25 extends vertically upright along exterior side surface 42A to upper end 56 at the top or upper end of cargo container 30 of trailer 22. Horizontal portion 50B of each assembly 25, in turn, extends inwardly away from side 26 of trailer 22 toward side 27 of trailer 22 over exterior top surface 40A of top panel 40 to open outer end 58 that is open in the direction of side 27 of trailer 22. Vertical portion 50A of each assembly 25 extends outward, three inches in this example, from exterior outer surface 42A of side panel 42 to front 51, which faces outwardly and is parallel relative to outer side surface 42A of side panel 42, and horizontal portion 50B of each assembly 25 extends upright, three inches in this example, from exterior top surface 40A of top panel 40.

Figure 9:
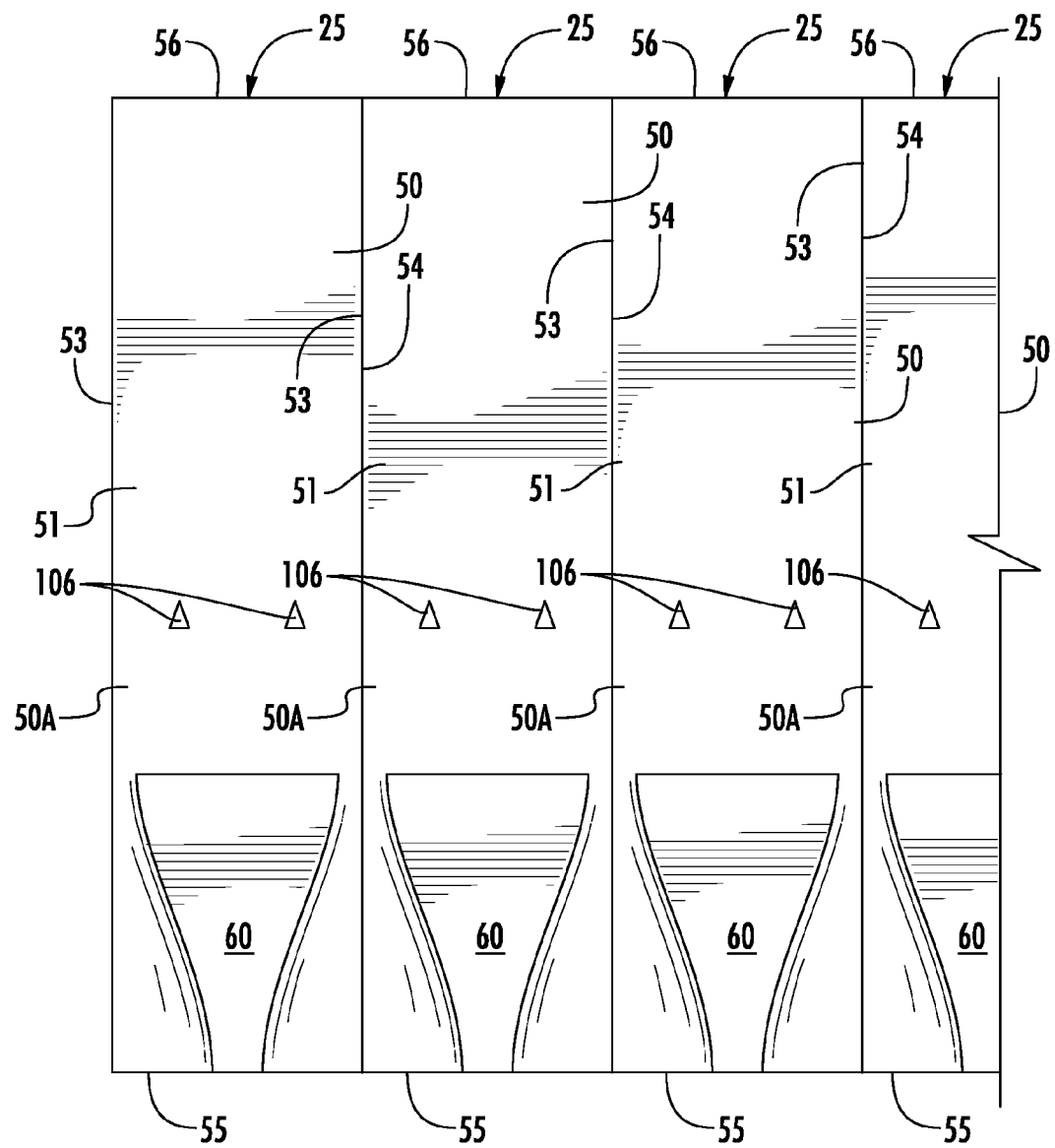
FIG. 9 is an enlarged, fragmented front elevation view of a plurality of the crosswind airflow countering thrust assemblies of FIG. 1 shown as they would appear connected together.
Figure 10:
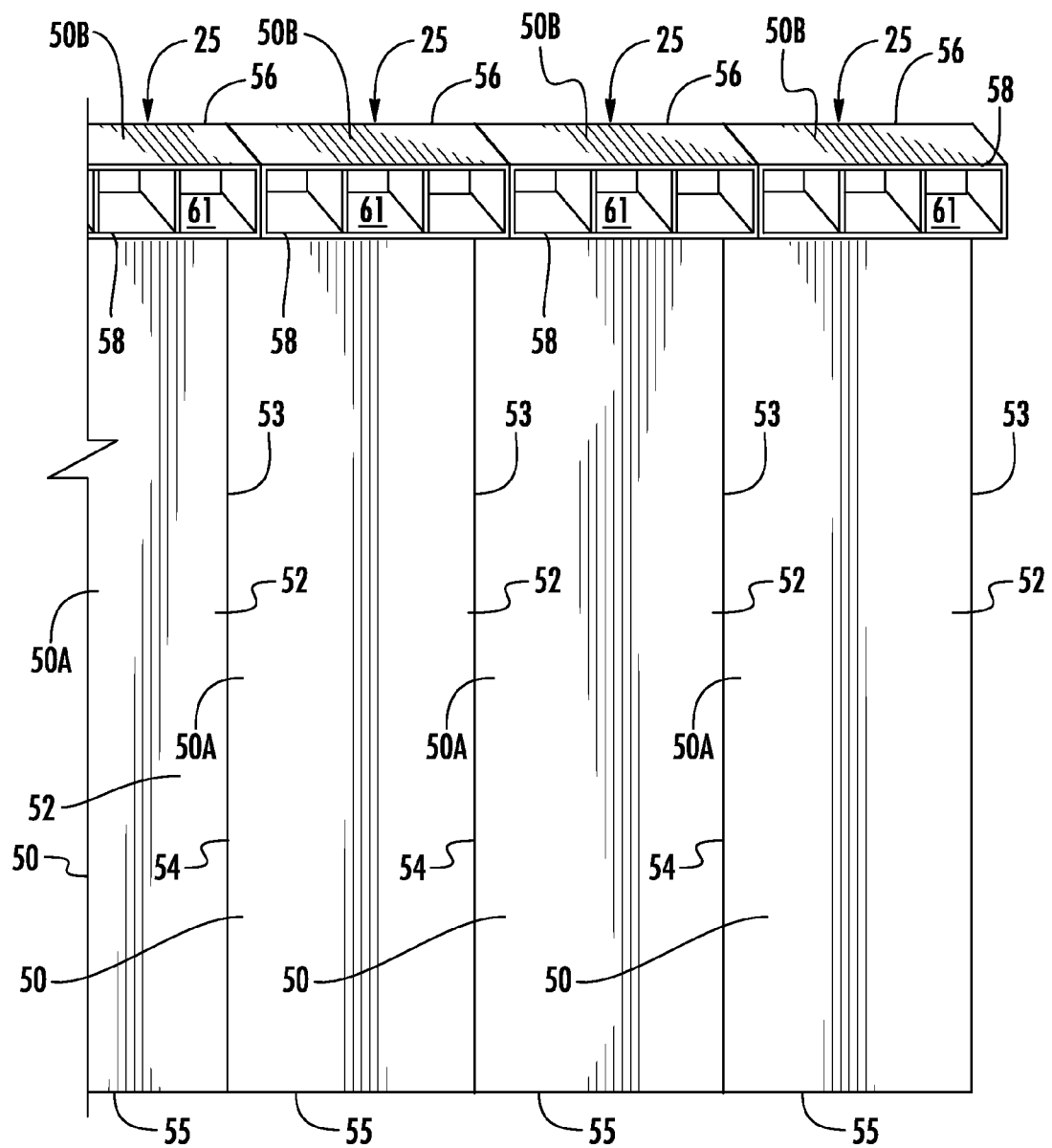
FIG. 10 is an enlarged, fragmented rear elevation view corresponding to the embodiment of FIG. 9.

In this illustrative embodiment, assemblies 25 of row A of assemblies 25 are connected together side 52 to side 53 with mechanical fasteners, and are each connected to cargo container 30 with mechanical fasteners. In FIG. 7 as a matter of illustration, a pair of mechanical fasteners 130 rigidly affix side 52 of assembly 25' to side 53 of the adjacent assembly 25 to the left of assembly 25', a pair of mechanical fasteners 130 rigidly affix side 53 of assembly 25' to side 52 of the adjacent assembly 25 to the right of assembly 25'. In the present embodiment, mechanical fasteners 130 are threaded bolts. Other forms of mechanical fasteners can be used in alternate embodiments, such as rivets, nut-and-bolt assemblies, etc. Welding, heat bonding, or adhesive can be used for connecting assemblies 25 side 52 by side 53 in still further embodiments. As a matter of illustration and reference, FIG. 9 is an enlarged, fragmented front elevation view of a plurality of assemblies 25 of row A of assemblies 25 shown as they would appear connected together, and FIG. 10 is an enlarged, fragmented rear elevation view corresponding to FIG. 9.

In this illustrative embodiment, the back 52 of vertical portion 50A of each assembly 25 is connected to side panel 42 at exterior side surface 42A with mechanical fasteners. In FIG. 8 as a matter of illustration, a pair of mechanical fasteners 130 rigidly affixes back 52 of assembly 25' side panel 42 at exterior side surface 42A. In the present embodiment, mechanical fasteners 130 are threaded bolts. Other forms of mechanical fasteners can be used in alternate embodiments, such as rivets, nut-and-bolt assemblies, etc. Welding, heat bonding, or adhesive can be used for connecting assemblies 25 to cargo container 30 of trailer 22 in still further embodiments. In yet a further embodiment, assemblies 50 can be formed in the construction cargo container 30.

In FIG. 8, back 52 of vertical portion 50A of assembly 25' is positioned against exterior side surface 42A of side panel 42 near the upper end of cargo container 30, vertical portion 50A extends vertically upright along exterior side surface 42A to upper end 56, and horizontal portion 50B extends inwardly away from side 26 of trailer 22 toward side 27 of trailer 22 over exterior top surface 40A of top panel 40 to open outer end 58. Vertical portion 50A of assembly 25' extends outward from exterior outer surface 42A of side panel 42 to front 51, which faces outwardly and is parallel relative to outer side surface 42A of side panel 42, and horizontal portion 50B of assembly 25' extends upright from exterior top surface 40A of top panel 40. In this orientation, NACA duct 60 faces outwardly in the direction of an oncoming crosswind airflow, and nozzle assembly 62 extends vertically upright through volume 57 of vertical portion 50A of housing 50 from inlet 60 (i.e., NACA duct 60) at lower end 55 of housing 50 to upper end 56 and through volume 57 of horizontal portion 50B of housing 50 to outlet 61 at open outer end 58, motive fluid nozzle 70 being coupled between inlet 60 and venturi tube 71, de Laval nozzle 72 being coupled between venturi tube 71 and ejection nozzle 73, and ejection nozzle 73 being coupled between de Laval nozzle 72 and outlet 61 at open outer end 58 of housing 50. Again, duct 120 extends upwardly through volume 57 of vertical portion 50A of housing 50 and curves into volume 57 of horizontal portion 50B of housing 50 and extends through and follows volume 57 of horizontal portion 50B of housing over exterior top surface 40A of top panel 40 of cargo container 30 of trailer 22 to outlet 61 at open outer end 58 of housing 50 in the direction of side 27 of trailer 22. In FIG. 8, inlet 60 is juxtaposed to exterior side surface 42A of side panel 42, outlet 61 is juxtaposed to exterior top surface 40A of top panel 40, and nozzle assembly 62 is coupled between inlet 60 and outlet 61. Each assembly 25 of row A of assemblies 25 is attached to cargo container 30 of trailer 22 in this way, and the foregoing discussion of the attachment of assembly 25' to cargo container 30 of trailer 22 applies to each assembly 25 of row A of assemblies 25.

As indicated above, ach assembly 25 of row A of assemblies 25 is designed to harvest a portion of a crosswind airflow against exterior side surface 42A of trailer 22, and reroute/redirect the harvested portion of the crosswind airflow upwardly away from the ground over which vehicle 20 is driven, and eject the harvested portion of the crosswind airflow outwardly over exterior top surface 40A away from street side 26 of trailer 22 in the direction of the curb side 27 of trailer 22 at the top or upper end of cargo container 30 of trailer 22 where the moment of the magnitude of force of vector component V1 of the crosswind is greatest for producing a reaction force, a countering reaction force, that is opposite to, and that at least partially counters, the crosswind airflow against exterior side surface 42A for at least partially alleviating instability and safety problems in vehicle 20 running in the crosswind airflow. Assemblies 25 of row A of assemblies 25 therefor cooperate to harvest portions of a crosswind airflow against exterior side surface 42A of trailer 22, and reroute/redirect the harvested portions of the crosswind airflow upwardly away from the ground over which vehicle 20 is driven, and eject the harvested portions of the crosswind airflow outwardly over exterior top surface 40A away from street side 26 of trailer 22 in the direction of the curb side 27 of trailer 22 at the top or upper end of cargo container 30 of trailer 22 where the moment of the magnitude of force of vector component V1 of the crosswind is greatest for producing a reaction force, a countering reaction force, that is opposite to, and that at least partially counters, the crosswind airflow against exterior side surface 42A for at least partially alleviating instability and safety problems in vehicle 20 running in the crosswind airflow all for the purposes of improving safety in handling the vehicle and inhibiting the need for the driver to overcorrect the vehicle or having to drive against or steer into the crosswind and for inhibiting the vehicle from rolling or tipping over in response to exposure to the crosswind. In accordance with this discussion, the operation of assembly 25' in FIGS. 7 and 8 will now be discussed, with the understanding that the ensuing discussion applies equally to each assembly 25 of row A of assemblies 25.

In FIG. 8, NACA duct 60 is juxtaposed to exterior side surface 42A of side panel 42, outlet 61 is juxtaposed to exterior top surface 40A of top panel 40, and nozzle assembly 62 is coupled between inlet 60 and outlet 61. Inlet 60 is for receiving a cross section or portion of a crosswind airflow against exterior side surface 42A of side panel 42 of cargo container 30 of trailer 22 and deflecting the portion of the crosswind airflow upwardly into nozzle assembly 62 as a diverted airflow, and nozzle assembly 62 for routing the diverted airflow upwardly from NACA duct 60 toward the outlet and deflecting the diverted airflow outwardly through outlet 61 as a countering thrust airflow over exterior top surface 40A of cargo container 30 of trailer 22 away from side 26 of trailer 22 toward side 27 of trailer 22 at the top or upper end of cargo container 30 of trailer 22 where the moment of the magnitude of force of vector component V1 of the crosswind is greatest for producing a reaction force, a countering reaction force, in the direction of arrowed line E that is opposite to, and that at least partially counters, the crosswind airflow. Each assembly 25 of row A of assemblies 25 operate in this way to produce countering thrust airflows for producing a collective reaction force, a collective countering reaction force, along the length of trailer 22 from proximate to front end 30A of cargo container 30 at leading end 28 of trailer 22 to proximate to rear end 30B of cargo container 30 at trailing end 29 of trailer 20 that is opposite to and that pushes against the crosswind airflow for at least partially countering the magnitude of force of force vector component V1 of the crosswind airflow.

In FIG. 8, ram floor 80 extends upwardly into volume 57 of vertical portion 50A of housing 50 from lower end 55 and is angled inwardly toward back 51 of housing from front 51 of housing 50 at lower end 55 to back 52 of housing 50. Ram floor 80 is angled inwardly from front 51 to back 52 at an angle φ of 125 relative to force vector component V1 of the crosswind airflow. The angle φ can be less than 125 degrees or more than 125 degrees if so desired consistent with the teachings set forth herein. The angle φ between ram floor 80 and the direction of force vector component V1 preferably is in a range of from 120 degrees to 130 degrees.

As the crosswind airflow having force vector component V1 blows against exterior side surface 42A, the force vector component V1 of the portion of the crosswind airflow entering inlet 60, which is perpendicular relative line or direction A of travel of vehicle 20 in FIG. 1 and to exterior side surface 42A of side panel 42 of cargo container 30 of trailer, strikes ram floor 80 of NACA duct 60, which deflects and reroutes/redirects the portion of the crosswind airflow upwardly into nozzle assembly 62, which flows through nozzle assembly 62 as a diverted airflow having force vector component V3 that has a direction of force that is vertically upward from lower end 55 of housing 50 to upper end 56 of housing 50 that is parallel relative to exterior outer surface 42A of side panel 42 and perpendicular relative to the direction of vector component V1, and that has a magnitude. This action of the crosswind against ram floor 80 converts the portion of the crosswind airflow having force vector component V1 entering inlet 60 that is perpendicular to exterior outer surface 42A of side panel 42 to a diverted airflow having force vector component V3 that is perpendicular relative to force vector component V1 and parallel relative to exterior outer surface 42A of side panel 42. The diverted airflow having vector component V3 passes vertically upward through nozzle assembly 62 relative to the ground over which vehicle 20 is driven from inlet 60 to upper end 56 of housing 50. The magnitude of the force of force vector component V1 of the crosswind airflow rams/drives diverted airflow having force vector component V3 through nozzle assembly 62 from inlet 60 to upper end 56 of housing 50 like a ram.

The diverted airflow flows vertically upward to outer end 60B of NACA duct 60 and into and vertically upward through nozzle assembly 62 first through convergent ducts 92 of motive fluid nozzle 70 illustrated in FIG. 7. NACA duct 60 operates as a ram air intake that uses the dynamic air pressure created by force vector component V1 of the crosswind airflow to increase the static pressure in the motive fluid nozzle 70. NACA duct 60 inherently does not affect the boundary layer (e.g., air flow along exterior side surface 42A of side panel 42) of cargo container 30 of trailer 22. The diverted airflow flows into and through convergent ducts 92 from inner end 90 of motive fluid nozzle 70 to outer end 91 of motive fluid nozzle 70 and through conduit 105 into the narrow inner end 101 of divergent cone 100 of venturi tube 71, which inherently both compresses/squeezes and accelerates the diverted airflow into divergent cone 100 and which accelerates through divergent cone 100 of venturi tube 71 from inner end 101 to outer end 102 of divergent cone 100. Venturi tube 71 inherently accelerates the diverted airflow as it flows therethrough exploiting the inherent and well-known principles of compressible fluids. Air intake conduits 106 drawn ambient air into conduit 105 and into inner end 101 of divergent cone 100 of venturi tube 71 to assist in the flow of the diverted airflow. The diverted airflow accelerated through divergent cone 100 of venturi tube 71 passes from outer end 102 of divergent cone 100 of venturi tube 71 and into convergent lower cone 111 of de Laval nozzle 72 through inner end 115, through pinched middle 113 and into and through upper divergent cone 112 to outer end 116 of de Laval nozzle 72. The diverted airflow passes through de Laval nozzle 72 from inner end 115 through convergent lower cone 11 to pinched middle, which inherently compresses/squeezes and accelerates the diverted airflow into divergent upper cone 112 and which accelerates through and expands in divergent upper cone 112 from pinched middle 113 to outer end 116 and into inner end 121 of duct 120 of ejection nozzle 73. The de Laval nozzle 72 inherently accelerates the diverted airflow as it flows therethrough exploiting the inherent and well-known principles of compressible fluids.

Because venturi tube 71 and de Laval nozzle 72 each inherently accelerate the diverted airflow, exploiting the inherent and well-known principles of compressible fluids, the magnitude of force of force vector component V3 of the diverted air flow increases through nozzle assembly 62 from motive fluid nozzle 70 to de Laval nozzle 72, and is greater exiting outer end 116 of de Laval nozzle 72 than entering inner end 80 of motive fluid nozzle 70. Nozzle assembly 62 is, accordingly, for routing the diverted airflow upwardly from inlet 60 toward outlet 61 and deflecting the diverted airflow outwardly through outlet 61 as a countering thrust airflow over exterior top surface 40A for producing a reaction force for at least partially countering the crosswind airflow.

The diverted airflow enters inner end 121 of duct 120 of ejection nozzle 73 from outer end 116 of divergent upper cone 112 of de Laval nozzle 72, which turns the vertically flowing diverted airflow from nozzle assembly 62 in vertical portion 50A of housing 50 through duct 120 of ejection nozzle 73, which flows through duct 120 at horizontal portion 50B as a countering thrust airflow having force vector component V4 that has a direction of force in the same direction of force vector V1 of crosswind from side 26 of cargo container 30 of trailer 22 toward side 27 of cargo container 30 of trailer from inner end of ejection nozzle 73 to outlet 61 of ejection nozzle that is perpendicular relative to exterior outer surface 42A of side panel 42 and the line or direction D of travel of vehicle 20 in FIG. 1, that is perpendicular relative to force vector component V3 of the diverted airflow in FIG. 8, that is horizontal relative to exterior outer surface 40A of top panel 40 in FIG. 8, and that has a magnitude. This transition between de Laval nozzle 72 and ejection nozzle 73 converts the diverted airflow through nozzle assembly 62 in volume 57 of horizontal portion 50A of housing 50 having force vector component V3 that is perpendicular relative to force vector component V1 and parallel relative to exterior outer surface 42A of side panel 42 to the countering thrust airflow through ejection nozzle 73 having force vector component V4 that is perpendicular relative to force vector component V3 of the diverted airflow in FIG. 8, that is horizontal relative to exterior outer surface 40A of top panel 40 in FIG. 8, and that has a magnitude. The magnitude of force of force vector V3 of the diverted airflow is at least a portion of the magnitude of force of force vector V1 of the crosswind, and the magnitude of force of force vector V4 of the countering thrust airflow is also at least a portion of the magnitude of force of force vector V1 of the crosswind, and is substantially equal to, being within from zero to five percent of, the magnitude of force of force vector V3 of the diverted airflow.

The countering thrust airflow having force vector component V4 thrusts outward through outlet 61 and open outer end 58 of housing 50 over exterior outer surface 40A of top panel 40 in the direction of side 27 of trailer 22 and away from side 26 of trailer 22 at the top or upper end of cargo container 30 of trailer 22 where the moment of the magnitude of force of vector component V1 of the crosswind is greatest. Because the force vector component V4 of the countering thrust airflow has a direction of force that is toward side 27 of trailer 22 and away from side 26 of trailer 22, that is perpendicular relative to exterior side surface 42A of cargo container 30 of trailer 22, that has a magnitude of force that is at least a portion of the magnitude of force of force vector component V1 of the crosswind, and is not directed against trailer 22 but rather over exterior top surface 40A of top panel 40 of cargo container 30 of trailer 22 opposite to outlet 61, the force vector component V4 of the countering thrust airflow thrusting outwardly from outlet 61 over exterior top surface 40A of top panel 40 of cargo container 30 of trailer 22 thrusts against outlet 61 of assembly 25' attached to cargo container 30 of trailer 22 producing a reaction force, a countering reaction force, against outlet 61 in the countering direction indicated by arrowed line E in FIG. 8, at the top or upper end of cargo container 30 of trailer 22 where the moment of the magnitude of force of vector component V1 of the crosswind is greatest, that is opposite to the direction of force vector component V1 of the crosswind and the direction of force vector component V4 of the countering thrust airflow for at least partially countering the magnitude of the force vector component V1 of the crosswind. This reaction force of the countering thrust airflow at the top or upper end of cargo container 30 of trailer 22 where the moment of the magnitude of force of vector component V1 of the crosswind is greatest is for stabilizing trailer 22, and thus vehicle 20 as whole, against the crosswind airflow having vector component V1 blowing against exterior outer surface 42A of side panel 42 of trailer 22, in accordance with the principle of the invention. Accordingly, assemblies 25 of row A of assemblies 25 therefor cooperate to produce countering thrust airflows outwardly over exterior top surface 40A away from street side 26 of trailer 22 in the direction of the curb side 27 of trailer 22 for producing a reaction force, a countering reaction force, along the length of trailer from proximate to front end 30A of cargo container 30 at leading end 28 of trailer 22 to proximate to rear end 30B of cargo container 30 at trailing end 29 of trailer 22 at the top or upper end of cargo container 30 of trailer 22 where the moment of the magnitude of force of vector component V1 of the crosswind is greatest, that is opposite to, and that at least partially counters, the force vector component V1 of crosswind airflow against exterior side surface 42A of side panel 42 of cargo container 30 of trailer 22 for at least partially alleviating instability and safety problems in vehicle 20 running in the crosswind airflow against exterior side surface 42A of side panel 42 of cargo container 30 of trailer 22.

Assemblies 25 of row B of assemblies 25 are oriented, connected together, and connected to cargo container 30 at the curb side of trailer 22 as a system like that of assemblies 25 of row A of assemblies 25. Accordingly, the discussion of the orientation of assemblies 25 of row A of assemblies 25 and how assemblies 25 are connected together and to cargo container 30 applies in every respect to assemblies 25 of row B of assemblies 25.

Briefly in regards to row B of assemblies 25 in FIG. 2, assemblies 25 of row B of assemblies 25 are oriented upright from lower ends 55 to upper ends 56, are connected together side 53 to side 54, are axially aligned side 53 by side 54 longitudinally along the length of cargo container 30 from proximate to front end 30A of cargo container 30 and at leading end 28 of trailer 22 to proximate to rear end 30B of cargo container 30 at trailing end 29 of trailer 22, and are each connected to cargo container 30 at the upper end of cargo container 30 of trailer 22 along side 27 of trailer 22. The back 52 (not shown in FIG. 2) of vertical portion 50A of each assembly 25 is positioned against exterior side surface 43A of side panel 43 near the upper end of cargo container 30, and the vertical portion 50A of each assembly 25 extends vertically upright along exterior side surface 43A to upper end 56 at the top or upper end of cargo container 30 of trailer 22. Horizontal portion 50B of each assembly 25, in turn, extends inwardly away from side 26 of trailer 22 toward side 27 of trailer 22 over exterior top surface 40A of top panel 40 to open outer end 58 that is open in the direction of side 27 of trailer 22. Vertical portion 50A of each assembly 25 extends outward, three inches in this example, from exterior outer surface 43A of side panel 43 to front 51, which faces outwardly and is parallel relative to outer side surface 43A of side panel 43, and horizontal portion 50B of each assembly 25 extends upright, three inches in this example, from exterior top surface 40A of top panel 40.

Each assembly 25 of row B of assemblies 25 operates identically, and yet oppositely, to each assembly 25 of row A of assemblies 35, in that each assembly 25 of row B of assemblies 25 is for producing countering thrust airflows outwardly over exterior top surface 40A away from curb side 27 of trailer 22, at the top or upper end of cargo container 30 of trailer 22 where the moment of the magnitude of force of vector component V2 of the crosswind is greatest, in the direction of the street side 26 of trailer 22 for producing a reaction force, a countering reaction force, in the direction of arrowed lines F, at the top or upper end of cargo container 30 of trailer 22 where the moment of the magnitude of force of vector component V2 of the crosswind is greatest, that is opposite to, and that at least partially counters, the force vector component V2 of crosswind airflow against exterior side surface 43A of side panel 43 of cargo container 30 of trailer 22 for at least partially alleviating instability and safety problems in vehicle 20 running in the crosswind airflow against exterior side surface 43A of side panel 43 of cargo container 30 of trailer 22 all for the purposes of improving safety in handling the vehicle and inhibiting the need for the driver to overcorrect the vehicle or having to drive against or steer into the crosswind and for inhibiting vehicle 20 from rolling or tipping over in response to exposure to the crosswind. Accordingly, assemblies 25 of row B of assemblies 25 therefor cooperate to produce countering thrust airflows outwardly over exterior top surface 40A away from curb side 27 of trailer 22 in the direction of the street side 26 of trailer 22 for producing a reaction force, a countering reaction force, along the length of trailer from proximate to front end 30A of cargo container 30 at leading end 28 of trailer 22 to proximate to rear end 30B of cargo container 30 at trailing end 29 of trailer 22 at the top or upper end of cargo container 30 of trailer 22 where the moment of the magnitude of force of vector component V1 of the crosswind is greatest, that is opposite to, and that at least partially counters, the force vector component V2 of crosswind airflow against exterior side surface 43A of side panel 42 of cargo container 30 of trailer 22 for at least partially alleviating instability and safety problems in vehicle 20 running in the crosswind airflow against exterior side surface 43A of side panel 43 of cargo container 30 of trailer 22. Although each assembly 25 of row B of assemblies 25 work in the opposite direction compared to each assembly 25 of row A of assemblies 25, the discussion of the operation assembly 25' of row A of assemblies 25 applies in every respect to the operation of each assembly of row B of assemblies 25.

In FIGS. 1-4, a forward wind deflector 130 at the upper end of trailer 22 is coupled between leading end 28 of trailer 22 and a forward-most assembly 25 of rows A and B of assemblies 25, and a rearward wind deflector 131 at the upper end of trailer 22 is coupled between trailing end 29 of trailer 22 and a rearward-most assembly 25 of rows A and B of assemblies 25. As vehicle 20 is driven in line or direction D of travel, forward wind deflectors 130 deflect oncoming wind away from the forward-most assembly 25 of the respective rows A and B of assemblies 25, and rearward wind deflectors 131 fold the wind tailing behind trailer 22 from the rearward-most assembly 25 of the respective rows A and B of assemblies 25.

Figure 3:
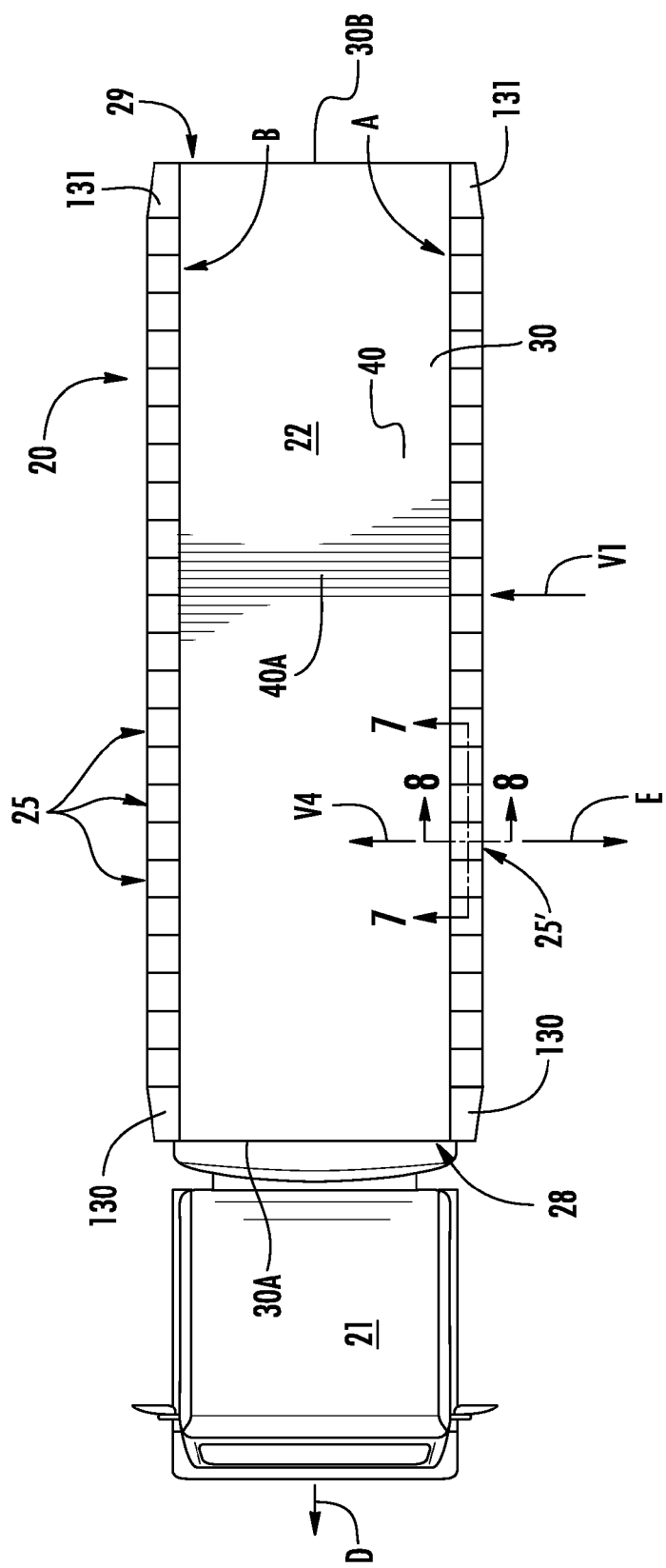
FIG. 3 is a top plan view of the embodiment of FIG. 1.

There are twenty-five assemblies in each of rows A and B of assemblies 25 as shown in FIGS. 1-3. Rows A and B of assemblies 25 can include less or more assemblies 25 as may be desired depending on the overall length of trailer 22 and the relative size of assemblies 25.

Figure 11:
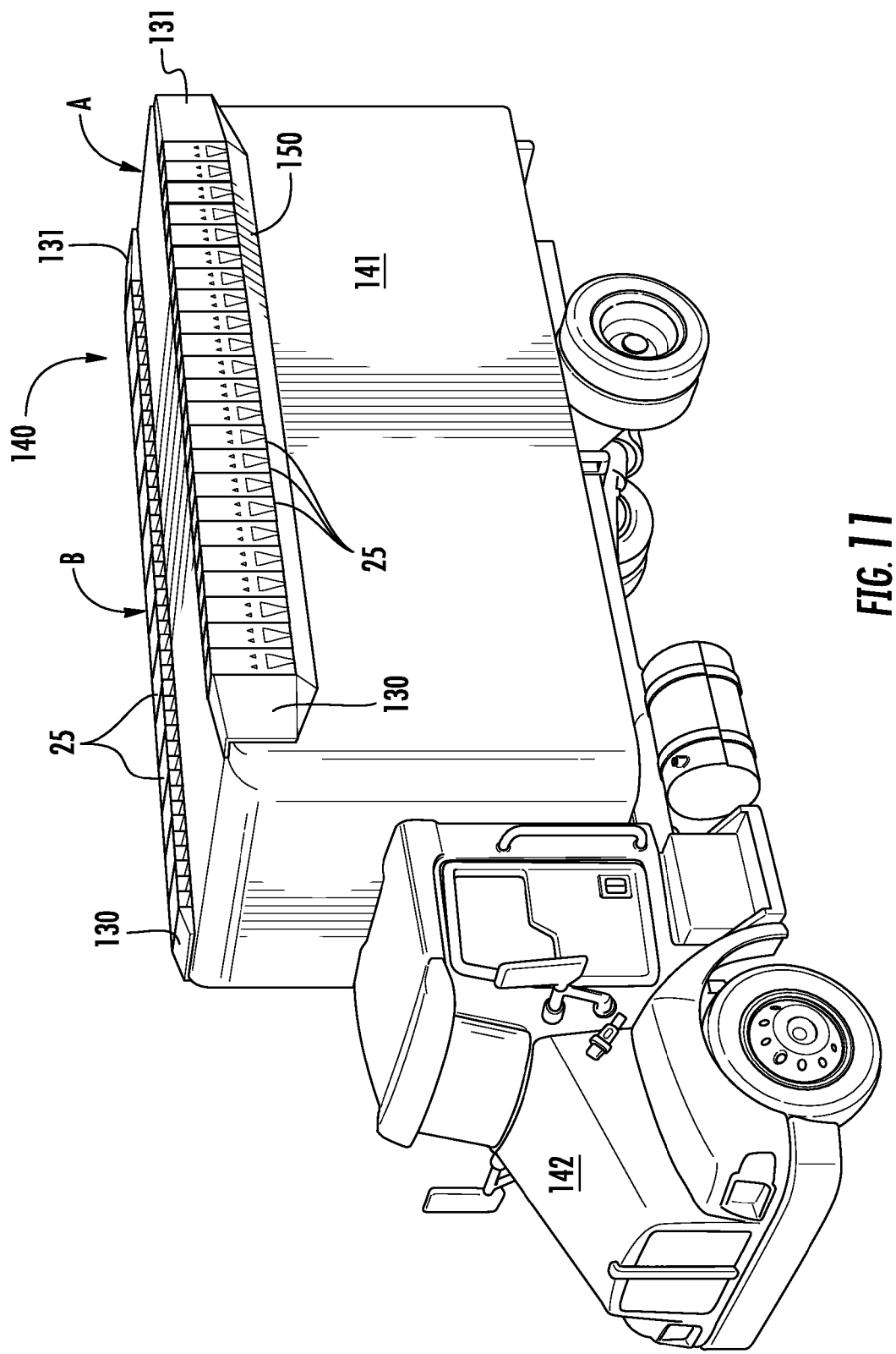
FIG. 11 is a perspective view of a box truck ground vehicle including a cargo container carried by a truck, and crosswind airflow countering thrust assemblies mounted to the cargo container for stabilizing the box truck ground vehicle against crosswind airflows.

Although assemblies 25 are disclosed on conjunction with a tractor-trailer ground vehicle, assemblies 25 can be identically incorporated with other types of high profile vehicles having large side/surface areas. As a matter of example, FIG. 11 is a perspective view of a box truck ground vehicle 140 including a cargo container 141 carried by a truck 142, and rows A and B of crosswind airflow countering thrust assemblies 25, and front and rearward wind deflectors 130 and 131, mounted to cargo container 141 for stabilizing box truck ground vehicle 140 against crosswind airflows. The skilled artisan will readily appreciate that assemblies 25 and deflectors 130 and 131 can be similarly incorporated with other vehicle types, such as vans, sport utility vehicles, tractor-trailers, motor homes, travel trailers, horse trailers, trains, etc. In FIG. 11, a longitudinal wind deflector 150 is connected to cargo container 141 and the lower ends of assemblies 25, which deflects updraft to prevent an area of high pressure from forming between the lower ends of assemblies 25 and cargo container. A similar wind deflector can be incorporated with the assemblies 25 on the opposite side of cargo container 141, and with the assemblies 25 discussed in conjunction with vehicle 20.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising a transport vehicle including a first side, a second side, an exterior top surface, an exterior side surface depending downwardly from the exterior top surface at the first side, an inlet juxtaposed to the exterior side surface, an outlet juxtaposed to the exterior top surface, and a nozzle assembly coupled between the inlet and the outlet, the inlet for receiving a portion of a crosswind airflow against the exterior side surface of the transport vehicle and deflecting the portion of the crosswind airflow upwardly into the nozzle assembly as a diverted airflow, the nozzle assembly for routing the diverted airflow upwardly from the inlet toward the outlet and deflecting the diverted airflow outwardly through the outlet as a countering thrust airflow over the exterior top surface of the transport vehicle toward the second side of the transport vehicle for producing a reaction force for at least partially countering the crosswind airflow.

2. The apparatus according to claim 1, wherein the nozzle assembly comprises a motive fluid nozzle, a venturi tube, a de Laval nozzle, and an ejection nozzle coupled in series from the inlet to the outlet.

3. The apparatus according to claim 2, wherein the inlet is NACA duct.

4. Apparatus comprising:
a transport vehicle including a first side, a second side, an exterior top surface, an exterior side surface depending downwardly from the exterior top surface at the first side, an inlet juxtaposed to the exterior side surface, an outlet juxtaposed to the exterior top surface, and a nozzle assembly coupled between the inlet and the outlet;
the inlet for receiving a portion of a crosswind airflow against the exterior side surface of the transport vehicle and deflecting the portion of the crosswind airflow upwardly into the nozzle assembly as a diverted airflow, the crosswind airflow includes a first force vector component, the first force vector component has a direction of force that is toward, and perpendicular relative to, the exterior side surface of the transport vehicle, and a first magnitude;
the nozzle assembly for routing the diverted airflow upwardly from the inlet toward the outlet juxtaposed to the exterior top surface, and deflecting the diverted airflow outwardly through the outlet as a countering thrust airflow over the exterior top surface of the transport vehicle toward the second side of the transport vehicle;
the countering thrust airflow includes a second force vector component, the second force vector component has a direction of force that is toward the second side of the transport vehicle and away from the first side of the transport vehicle, that is perpendicular relative to the exterior side surface of the transport vehicle, and that has a second magnitude that is at least a portion of the first magnitude of the first vector component; and
the second force vector component of the countering thrust airflow from the outlet for producing a reaction force in a countering direction opposite to the direction of the first force vector component and the direction of the second force vector component for at least partially countering the first magnitude of the first force vector component.

5. The apparatus according to claim 4, wherein the nozzle assembly comprises a motive fluid nozzle, a venturi tube, a de Laval nozzle, and an ejection nozzle coupled in series from the inlet to the outlet.

6. The apparatus according to claim 5, wherein the inlet is NACA duct.

7. Apparatus comprising:
a transport vehicle including an leading end, a trailing end, a first side, a second side, an exterior top surface, and an exterior side surface depending downwardly from the exterior top surface at the first side; and
crosswind airflow countering thrust assemblies mounted to the transport vehicle between the leading end and the trailing end, each one of the crosswind airflow countering thrust assembly comprises an inlet juxtaposed to the exterior side surface, an outlet juxtaposed to the exterior top surface, and a nozzle assembly coupled between the inlet and the outlet, the inlet for receiving a portion of a crosswind airflow against the exterior side surface of the transport vehicle and deflecting the portion of the crosswind airflow upwardly into the nozzle assembly as a diverted airflow, the nozzle assembly for routing the diverted airflow upwardly from the inlet toward the outlet and deflecting the diverted airflow outwardly through the outlet as a countering thrust airflow over the exterior top surface of the transport vehicle toward the second side of the transport vehicle for producing a reaction force for at least partially countering the crosswind airflow.

8. The apparatus according to claim 7, wherein the nozzle assembly comprises a motive fluid nozzle, a venturi tube, a de Laval nozzle, and an ejection nozzle coupled in series from the inlet to the outlet.

9. The apparatus according to claim 8, wherein the inlet is NACA duct.

10. The apparatus according to claim 7, further comprising a forward wind deflector coupled between the leading end of the transport vehicle and a forward-most one of the crosswind airflow countering thrust assemblies proximate to the leading end of the transport vehicle.

11. The apparatus according to claim 10, further comprising a rearward wind deflector coupled between the trailing end of the transport vehicle and a rearward-most one of the crosswind airflow countering thrust assemblies proximate to the trailing end of the transport vehicle.

12. Apparatus comprising:
a transport vehicle including an leading end, a trailing end, a first side, a second side, an exterior top surface, and an exterior side surface depending downwardly from the exterior top surface at the first side;
crosswind airflow countering thrust assemblies mounted to the transport vehicle between the leading end and the trailing end;
each one of the crosswind airflow countering thrust assemblies comprises:
an inlet juxtaposed to the exterior side surface, an outlet juxtaposed to the exterior top surface, and a nozzle assembly coupled between the inlet and the outlet;
the inlet for receiving a portion of a crosswind airflow against the exterior side surface of the transport vehicle and deflecting the portion of the crosswind airflow upwardly into the nozzle assembly as a diverted airflow, the crosswind airflow includes a first force vector component, the first force vector component has a direction of force that is toward, and perpendicular relative to, the exterior side surface of the transport vehicle, and a first magnitude;
the nozzle assembly for routing the diverted airflow upwardly from the inlet toward the outlet juxtaposed to the exterior top surface, and deflecting the diverted airflow outwardly through the outlet as a countering thrust airflow over the exterior top surface of the transport vehicle toward the second side of the transport vehicle;
the countering thrust airflow includes a second force vector component, the second force vector component has a direction of force that is toward the second side of the transport vehicle and away from the first side of the transport vehicle, that is perpendicular relative to the exterior side surface of the transport vehicle, and that has a second magnitude that is at least a portion of the first magnitude of the first vector component; and
the second force vector component of the countering thrust airflow from the outlet for producing a reaction force in a countering direction opposite to the direction of the first force vector component and the direction of the second force vector component for at least partially countering the first magnitude of the first force vector component.

13. The apparatus according to claim 12, wherein the nozzle assembly comprises a motive fluid nozzle, a venturi tube, a de Laval nozzle, and an ejection nozzle coupled in series from the inlet to the outlet.

14. The apparatus according to claim 13, wherein the inlet is NACA duct.

15. The apparatus according to claim 12, further comprising a forward wind deflector coupled between the leading end of the transport vehicle and a forward-most one of the crosswind airflow countering thrust assemblies proximate to the leading end of the transport vehicle.

16. The apparatus according to claim 15, further comprising a rearward wind deflector coupled between the trailing end of the transport vehicle and a rearward-most one of the crosswind airflow countering thrust assemblies proximate to the trailing end of the transport vehicle.

* * * * *